Figure 1:
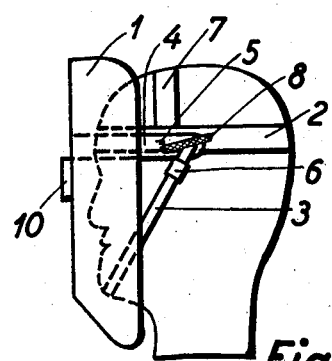

Jan. 25, 1955 H. A. LARSEN 2,700,158
FACE PROTECTOR
Filed Feb. 6, 1950

INVENTOR.
HANS ANDREAS LARSEN
BY
ATTORNEYS

United States Patent Office 2,700,158
Patented Jan. 25, 1955

2,700,158

FACE PROTECTOR

Hans Andreas Larsen, Charlottenlund, near Copenhagen, Denmark

Application February 6, 1950, Serial No. 142,563

Claims priority, application Denmark February 15, 1949

1 Claim. (Cl. 2—8)

During welding, especially electric welding, it is known to use a welding screen held in one hand for the protection of the face and especially the eyes against the strong flare from the welding point and against hot gases arising from said point. While the welding operation proper is being performed the screen is kept in such a position that the welding point can be inspected through a pane of dark-coloured glass inserted in the screen, and after a welding operation has been finished the screen is removed so that the welding can be inspected directly.

The above-mentioned known screen constantly occupies one of the welder's hands so that said hand can, practically speaking, not be used for the performance of other work, e. g. for holding and guiding a wire of filling material. This serious drawback has to some degree been remedied through another known welding screen which is carried swingably by a strap tightened around the welder's head, there being between the screen and said strap provided a hinge device in which the friction is so that the screen will remain in any position in which it has been set. At the commencement of a welding operation the screen is pulled down in front of the welder's face, and when the welding operation has been finished it is once more made to take up an inactive position above the welder's head. As already mentioned, the above-mentioned drawback is only partly remedied by this welding screen, it being necessary for the welder constantly to use one of his hands for operating the screen during the downward or upward swinging of the latter. This welding screen furthermore has the drawback that the friction necessary for fixing the screen in one or the other position causes the carrying strap tightened around the head to be pushed or pulled out of its position by the motion of the screen, which is especially the case when the welder holds e. g. a welding rod in the hand with which he is to handle the screen, as in this case he will try to get the screen into its position by pushing or pressing it with the back of his hand or by jerking his head. When hereby the carrying strap has worked loose the welder must use both hands for re-tightening it around his head.

The purpose of the invention is to procure a face protector, e. g. a welding screen, which is capable of being moved from an active position into an inactive position and vice versa without the use of the welder's hands, and which can furthermore be handled in such a way that the screen will not work loose from the welder's head during the handling.

More exactly defined, the invention relates to a face protector, e. g. a welding screen, of the kind in which a screen consisting wholly or partly of a transparent material is carried swingably by a head strap or a corresponding carrying member intended for being mounted on the user's head, so that the screen can be swung from an operative position in which it protects the face, especially the eyes, into a position in which the field of view of the eyes is not or only slightly limited by the face-protector. According to the invention this face protector is characterised in that the screen is connected to a chin strap in such a way that a downwards-directed motion of the chin strap caused by a motion of the user's lower jaw will entail a more or less extensive swinging of the screen away from its operative position.

When once the face protector in accordance with the invention has been strapped to the head, the wearer can without any use whatever of his hands at wish make the screen proper take up any position in relation to his face, a very slight downward motion of his lower jaw being capable of making the screen perform an extensive swinging in relation to the head strap, after which a lifting of the jaw will cause the screen to swing downwards once more. The force exerted on the head strap or the corresponding carrying member through the chin strap can easily be counteracted, e. g. by means of a strap which is connected to the head strap at two mutually opposite points and treads firmly on the scalp of the wearer, so that the face protector in accordance with the invention will remain well and securely fastened to the head of the wearer, also during the handling of the screen proper.

From Danish specification No. 28,781 is known a protector consisting of a mask intended for being secured to the face and carrying two swingably mounted goggle glasses. Each glass is carried by an axle, one end of which is bent to form a crank which is connected to one end of a strap placed under the chin of the user, so that a downwards-directed motion of the lower jaw will entail an upwards-directed swinging of the two goggle glasses. An essential difference between this known construction and the face-protector in accordance with the invention consists in that the chin strap is in the former case intended for serving as manoeuvring member for the goggle glasses only and not, as in the latter case, i. e. in the case of the face protector in accordance with the invention, for the actuation of the whole of the part of the face protector situated in front of the face. A further considerable drawback of the known protection goggles, and a drawback that is decisive of their practical application as compared to the face protector in accordance with the invention, is that the goggle mask holding the glasses is kept in its place by means of a strap which is placed around the back of the head of the wearer and tightens the mask against the wearer's nose and cheeks so that, out of regard to the fixation of the goggles, a considerable and highly inconvenient pressure must necessarily be exerted on these parts of the face. In contradistinction to this, the screen, corresponding to the mask and glasses of the goggles known, of the protector in accordance with the invention is carried by a head strap which is placed all the way around the wearer's head and in front rests on the forehead which can without inconvenience stand a considerable pressure, while even in its operating position the screen proper lies slightly removed from the face and exerts no pressure on the latter.

When the face protector is of the kind in which the screen is carried swingably by the head strap or the corresponding carrying member by means of two hinge pins, the ends of the chin strap may in accordance with the invention advantageously be connected to the screen proper or to a frame secured to the latter or to similar frame parts at points situated on the side of the hinge pins facing away from the screen.

If, on the other hand, the screen of the face protector is swingable around a horizontal axis at the front part or forehead-part of the head strap or the corresponding carrying member, one end, at least, of the chin strap may in accordance with the invention be connected to a swingable link, e. g. a bell crank, which through a wire or rod is connected to the screen so that a turning of the link by a motion of the chin strap will cause an upward or downward swinging of the screen. This construction is especially advantageous in the case of face-protectors with comparatively small and light screens, e. g. for the use of motorists.

In the face protector in accordance with the invention there may furthermore between the swingable screen and the head strap or the corresponding carrying member be provided one spring, at least, for facilitating the motion of the screen during at least part of its upward swing. This spring or each of these springs may be arranged for fixing the screen in a more or less swung-up or open position.

For the attainment of a secure fixation of the chin strap to the chin, a cup or like member may be secured to this strap, and in accordance with the invention there may furthermore to the chin strap or to the cup of the latter be secured a detachable air hose, through which can be supplied breathing air for the person wearing the face protector and for compressed air for removing hot and smoke-filled welding gases. When the air hose is secured in this way, air may be supplied in any direction desired, both when the screen is in its operating position and when it is raised or swung up.

Figure 2:
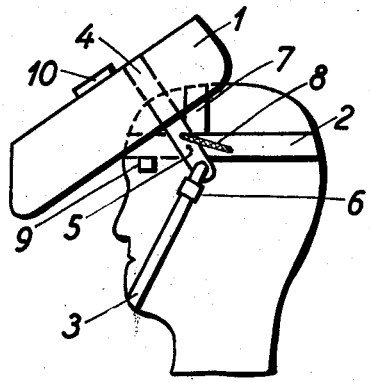
Figure 3:
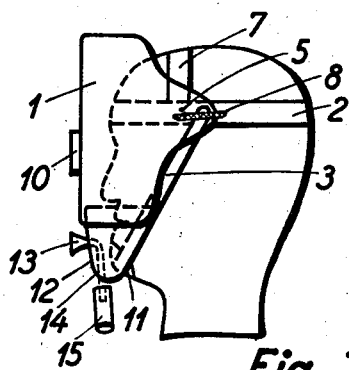
Figure 4:
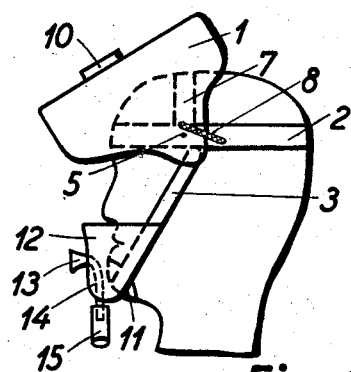

The invention is further explained by some embodiments with reference to the drawing in which:

Figs. 1 and 2 show a face protector in the form of a welding screen in its working position and inoperative position, respectively, Figs. 3 and 4 in a similar way another embodiment of a welding screen with air supply means, and Figs. 5 and 6 once again in a similar way a protector with a comparatively small and light screen which is swingable around a horizontal axis situated in front of the forehead of the user.

The face protector illustrated in Figs. 1 and 2 comprises a screen 1, a head strap 2, and a chin strap 3. The screen 1 may consist of any suitable material, e. g. pressed aluminum plate, which together with the necessary strength possesses a comparatively low weight, and in this embodiment the screen is secured, e. g. riveted, to a carrying hoop or a frame 4 carried swingably by two hinge pins 5 which are secured to the head strap 2 or form parts of hinge devices secured thereto. Each end of the chin strap 3 is through a clasp 6, shown strongly diagrammatically on the drawing, connected swingably to the free end of the corresponding side branch of the carrying hoop 4 at a point which is situated on the side of the hinge pin 5 facing away from the screen 1, so that the screen 1 will be swung upwards from the position shown in Fig. 1 when downwards-directed pull is exerted in the chin strap on account of a motion of the chin or the user's lower jaw. By a suitable choice of the distance between the hinge pin 5 and the point of fixation of the chin strap a convenient ratio can be attained between the motion of the chin strap and the motion of the screen.

For ensuring the position of the head strap 2 on the head under the stress from the chin strap 3 a scalp strap 7 may with its ends be secured to the head strap 2 at opposite points of the latter, and both the head strap 2 and the scalp strap 7 are, as is the case with the chin strap 3, adjustable by means of clasps not shown.

Between the screen 1 and the head strap 2, two metallic helical springs 8 are placed, only one of which is, however, shown on the drawing. In the embodiment shown in Figs. 1 and 2 these springs serve three purposes, viz. in part the facilitation of the swinging up of the screen 1 during part of the motion of the latter, in part the fixation of the screen in a swung-up or open position, and in part, together with an abutment 9 which is secured to the head strap 2 and which can be seen only in Fig. 2, also the fixation of the screen 1 in the operative position of the latter, one side branch of the carrying hoop 4 being in this position on account of the action of the springs 8 kept pressed against this abutment. An abutment 9 may be provided for each of the side branches of the hoop 4.

For the attainment of the above-mentioned three effects, one end of the spring 8 shown is secured to the head strap 2, while the other end of the spring is secured to one of the side branches of the hoop 4, and the points of attachment are chosen so that the axis of the spring or the line of connection between these points of attachment lies below the hinge pin 5 when the screen 1 is in its operative position, Fig. 1, but during the swinging-up of the screen passes this hinge pin and is made to lie above the pin when the screen has been swung up, Fig. 2.

The screen may have any suitable form and size, and in the screen a pane of coloured glass may be mounted or the screen may, as indicated in Figs. 1 and 2, have a frame 10 into which such a coloured glass pane may be slid.

The face-protector shown in Figs. 3 and 4 in its closed and open positions, respectively, comprises a screen 1, a head strap 2, a chin strap 3, two hinge pins 5, a scalp strap 7, and two helical springs 8. In Figs. 3 and 4 no abutment has been shown for the screen 1 for the support of the latter in its operative position, but one or more such abutments may be provided at wish. The main difference from the embodiment shown in Figs. 1 and 2 consists in that the screen 1 in Figs. 3 and 4 has rearward side extensions so as to be carried directly by the hinge pins 5, and that a cup 11 or the like is in this embodiment secured to the chin strap 3, which cup partly encloses the chin and thereby prevents the strap from slipping off. A carrying member 12, e. g. in the form of an upwardly open, funnel-shaped container, is also secured to the chin strap, said carrying member serving for a preferably adjustable fixation of a mouthpiece 13 which through a short tube 14 is connected to an air hose 15. By air being blown out through the mouthpiece 13, smoke and hot gases from a welding electrode or a welding bath can be blown away from the welder's face so that he is not inconvenienced thereby.

The chin strap 3, Figs. 3 and 4, may be adjustable by means of two clasps, not shown, one on either side of the cup 11, so that in case of an alteration of the length of the strap said cup will remain in its place halfway between the two points of attachment of the strap 3 in the screen 1.

Figure 5:
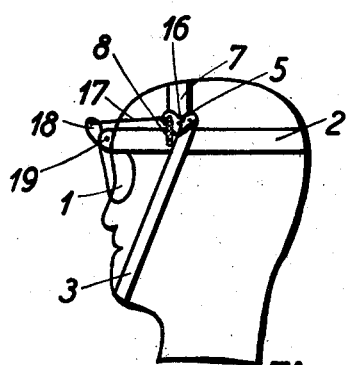
Figure 6:
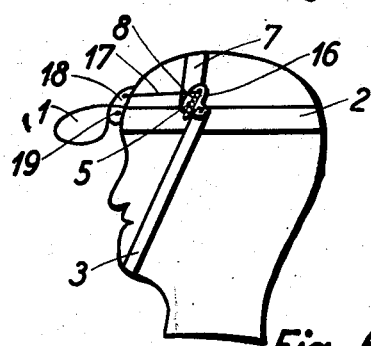

The face protector shown in Figs. 5 and 6 has a small and light screen 1 which may be made entirely of transparent material, e. g. Celluloid, and this protector is especially well suited for the drivers of motor vehicles, but may, however also be used for the protection of the eyes and part of the face under other circumstances. The screen is carried by a head strap 2 and may by means of a chin strap 3 be swung upwards around a horizontal axis situated in front of the forehead. Each end of the chin strap 3 is connected to one branch of a bell crank 16 which can turn around a hinge pin 5 secured to the head strap 2 or the scalp strap 7. The other branch of this bell crank is through a wire or rod 17 connected to an arm 18 which is rigidly attached to the screen 1 and together with the screen is swingable around a hinge pin 19. To said other branch of the bell crank 16 there has furthermore been fastened one end of a diagrammatically shown spring 8 which is mounted and arranged in such a way that in the position shown in Fig. 5 it holds the screen 1 against the face or against a suitable abutment with a light pressure, while in Fig. 6 it serves for fixing the screen in its raised position. A suitable ratio between the motions of the chin strap and the screen may also here be attained by a suitable choice of the lengths of the arm 18 and the branches of the bell crank 16.

The invention is not limited to the embodiments shown on the drawing, it being possible to combine these with each other or otherwise to alter them within the scope of the invention. By way of example, the screen 1 in Figs. 5 and 6 may have a fixed visor which protects the eyes from the sun when the screen is in the position shown in Fig. 5 or which catches raindrops which would otherwise hit the screen.

I claim:

A face protector comprising a supporting frame to be held on the head of a wearer, a protector screen for the face of the wearer mounted on said frame at pivots at each side thereof, said screen having an extension thereon on each side extending beyond and rearwardly of said pivot, a sight window in said screen, a chin strap having its ends connected to said extensions whereby upon movement of the chin of the wearer said screen is raised away from the wearer's face, resilient means having one end connected to said frame rearwardly of said pivot and the other end to said extension slightly at one side below said pivot and forwardly thereof, said extension being adapted to pivot to an extent whereby said resilient means moves across said pivot thereby exercising a toggle action to hold said screen in open or closed position.

References Cited in the file of this patent

UNITED STATES PATENTS

| Number | Name | Date |
| --- | --- | --- |
| 1,587,893 | Bowers | June 8, 1926 |
| 2,103,006 | Helfenstein et al. | Dec. 21, 1937 |
| 2,326,376 | Markgraf et al. | Aug. 10, 1943 |
| 2,410,593 | Wright | Nov. 5, 1946 |
| 2,449,303 | Laing | Sept. 14, 1948 |
| 2,485,117 | Settle | Oct. 18, 1949 |
| 2,487,183 | Rohef | Nov. 8, 1949 |
| 2,588,553 | McWethy | Mar. 11, 1952 |

FOREIGN PATENTS

| Number | Country | Date |
| --- | --- | --- |
| 537,469 | Germany | Nov. 3, 1931 |